United States Patent
Yellin

[15] 3,659,898
[45] May 2, 1972

[54] CHAIR
[72] Inventor: Bernard Yellin, 5252 S. Kolman Ave., Chicago, Ill. 60532
[22] Filed: Dec. 9, 1970
[21] Appl. No.: 96,316

[52] U.S. Cl. ...........................297/445, 297/27, 297/443, 297/460
[51] Int. Cl. .................................A47c 7/00, A47c 3/00
[58] Field of Search ...................297/27, 39, 443–445, 297/452, 460, DIG. 2; 160/402

[56] References Cited

UNITED STATES PATENTS

| | | |
|---|---|---|
| 3,205,008 | 9/1965 | Murray et al. ...........................297/425 |
| 2,390,878 | 12/1945 | Greitzer...........................297/444 X |
| 3,061,374 | 10/1962 | Grosfillex..........................297/445 X |
| 3,155,425 | 11/1964 | Chreist............................297/452 X |
| 3,159,428 | 12/1964 | Schier................................297/452 |
| 2,893,096 | 7/1959 | Fernberg............................160/402 |
| 3,384,148 | 5/1968 | Sarginson et al....................160/368 |
| 3,253,860 | 5/1966 | Shapiro..............................297/460 |

Primary Examiner—Casmir A. Nunberg
Attorney—Max R. Kraus

[57] ABSTRACT

A chair characterized by a seat portion integrally molded of a plastic material and a back rest portion integrally molded of a plastic material, each readily attachable respectively to a seat frame and to a back frame of a chair.

6 Claims, 8 Drawing Figures

Patented May 2, 1972
3,659,898
2 Sheets-Sheet 1
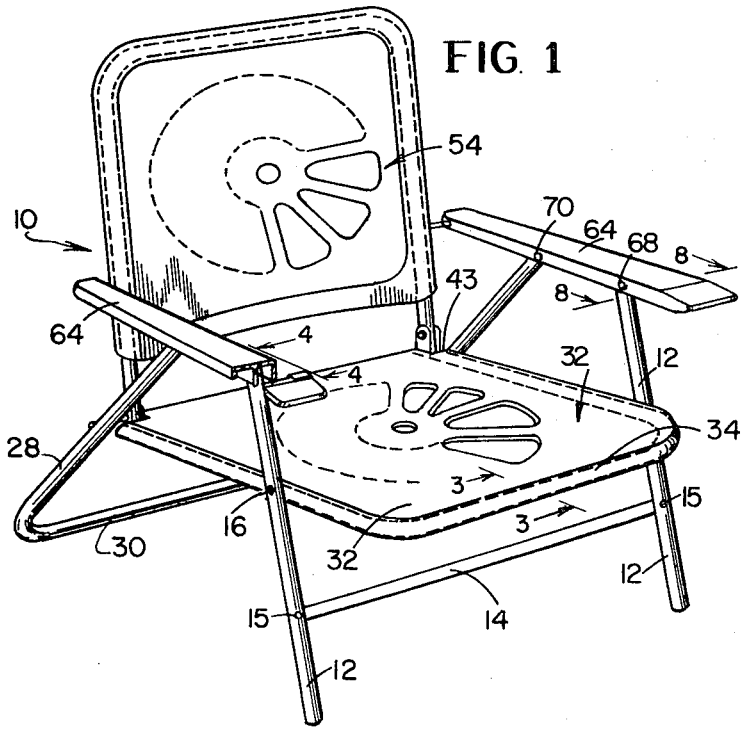
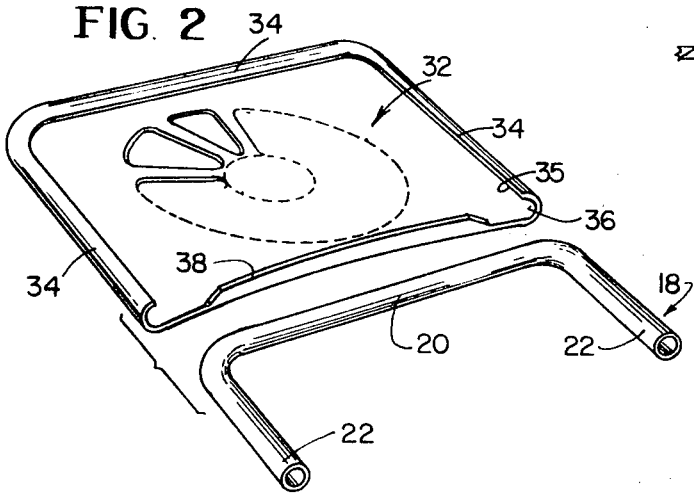
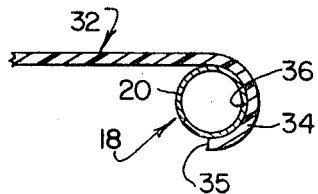
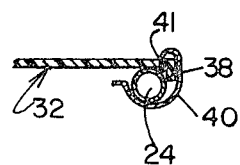
INVENTOR
BERNARD YELLIN
Max R. Kraus
ATTY.

Patented May 2, 1972
3,659,898
2 Sheets-Sheet 2
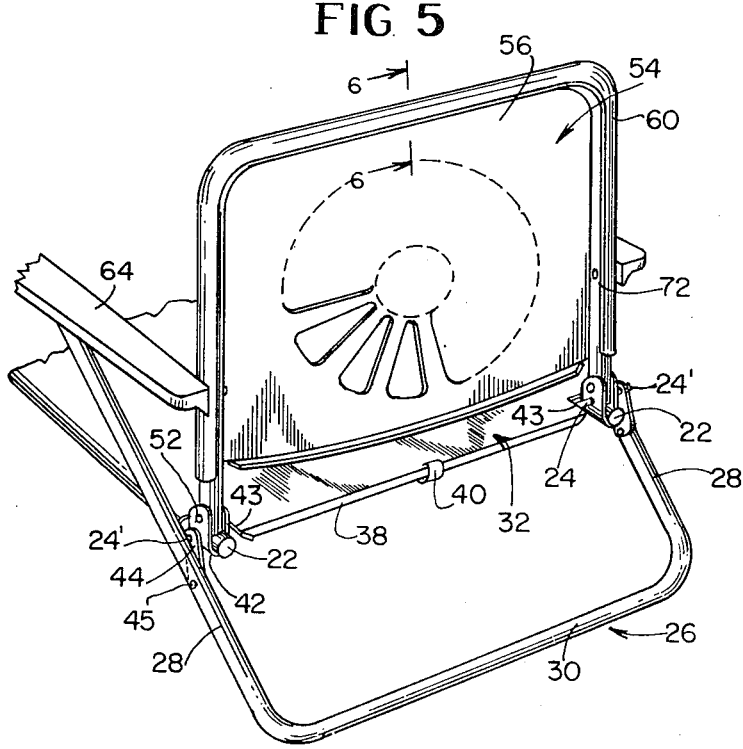
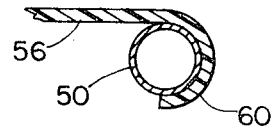
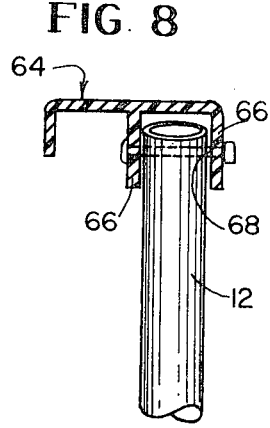
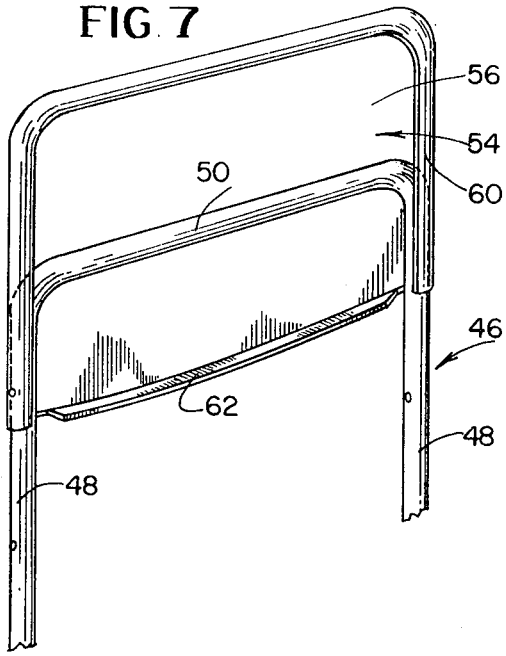
INVENTOR
BERNARD YELLIN
Max R. Kraus
ATTY.

3,659,898

CHAIR

BRIEF SUMMARY OF THE INVENTION

One of the objects of this invention is to provide a chair, particularly of the collapsible or folding type, in which the legs, seat frame and back rest frame are made of tubular metal stock, preferably aluminum, and in which the invention is characterized by providing a seat portion and a back rest portion each separately and integrally molded of a plastic material so that said seat portion and back rest portion can be readily secured respectively to the seat frame and the back rest frame of the chair and be supported thereby.

Another object of this invention is to provide an improved seat portion and a back rest portion for a chair, each of which is integrally molded of a plastic material and so constructed that they may be readily applied to and secured to the seat frame and back rest frame of chair, said seat and back rest capable when molded to form a distinctive and ornamental design to enhance the appearance of the chair.

Other objects will become apparent as this description progresses.

BRIEF DESCRIPTION OF THE DRAWINGS

In the drawings:

FIG. 1 is a view of a collapsible chair showing same in seating position with the seat portion and back rest portion each molded of a plastic material.

FIG. 2 is a view showing the underside of the seat portion and a portion of the seat frame to which it is applied.

FIG. 3 is a sectional view taken on line 3—3 of FIG. 1.

FIG. 4 is a sectional view taken on line 4—4 of FIG. 1.

FIG. 5 is a rear perspective view showing the back portion as applied to the back frame of the chair.

FIG. 6 is a sectional view taken on line 6—6 of FIG. 5.

FIG. 7 is a rear view showing the rear of the back rest portion being slipped onto the rear frame of the chair, and FIG. 8 is a view taken on line 8—8 of FIG. 1.

The collapsible or folding chair, generally indicated at 10, comprises a pair of spaced front legs 12 formed of aluminum tubular stock. A cross-member 14 is secured to the legs by suitable rivets 15 which extend through suitable openings in the front legs and are anchored to the cross-member. The front legs 12 are pivotally secured as at 16 to a U-shaped seat frame designated by the numeral 18, also formed of a tubular stock. Said seat frame 18 includes a front portion 20 and two opposite side portions 22 forming the U-shaped configuration. A tubular rod 24 extends across the rear of the seat and is secured in suitable openings in the side portions 22 of the seat frame and said tubular rod extends through and outwardly of said side portions of the seat frame by opposite end extensions 24', which extensions are adapted to engage the rear legs to support the chair in seating position, as will be subsequently described. The rear leg member generally designated at 26 is of a generally U-shaped configuration and is also formed of aluminum tubular stock and is bent to form two opposite spaced sides 28 connected by a bottom portion 30.

The plastic seat portion forming this invention is generally designated by the numeral 32 and same comprises a member which is integrally molded of plastic material, preferably linear polyethylene, to form a seat portion which is generally flat with a downwardly extending continuous flange generally designated by the numeral 34. Said flange is continuous and extends along the opposite sides as well as the front of said seat portion. Said flange, as best seen in FIGS. 2 and 3, is of a curved or arcuate shape and forms a concave inner surface 36 and is adapted to engage the tubular seat frame 18 along the sides 22 and front 20. The seat 32 is applied to the seat frame by positioning the rear end of the seat adjacent the front 20 of the seat frame and then sliding the seat rearwardly until the front flange of the seat engages the front portion 20 of the seat frame. The curvature of the flange 34 is such that when applied to the tubular seat frame the free edge 35 of the flange will extend slightly inwardly of the longitudinal axis of the tubular frame, as best shown in FIG. 3, yet it is of such shape that it may be molded in a die. The rear edge of the seat is provided with a downwardly extending straight flange 38 (FIG. 4) which is adapted to lie contiguous to but rearwardly of the rear rod 24. The seat may be molded to form any design configuration and, as shown in a fragmentary view of the ornamental design of the seat in FIG. 1, the design may include a central hub with radiating members connected to the border of the seat. Some of the radiating members have been provided with openings. The radiating members are additionally connected by circular members. It will be understood that the seat may be molded to form any other design or configuration and it is not limited to the specific design shown.

After the seat 32 is slipped on to the seat frame 18, it is locked to said seat frame by a metal clip 40 (FIG. 4) which extends through an opening 41 in the rear of the seat and around the rod 24. It is additionally locked to the seat frame against removal at the pivotal points 16 by rivets which pass through aligned openings in the front leg members 12, an opening in the flange 34 of the seat 32, as well as through the aligned openings in the sides 22 of the seat frame 18. The front legs 12 are therefore pivoted as at 16 with respect to the seat 32 and seat frame 18 for collapsing the chair.

A U-shaped metal bracket 42 (FIG. 5) is secured on each of the sides 22 of the seat frame to extend upwardly thereof and said bracket extends under the sides of the seat frame and upwardly thereof. A short link 44 has an opening at the top thereof which is positioned on the rear extension 24' for pivotal movement. The lower end of the link 44 has an opening to accommodate a rivet 45 which passes through the tubular side 28 of the rear leg member 26. It will be seen that the rear of the seat is pivotally connected to the rear leg member by such links, one on each side of the chair. The rear end of the seat portion 32 is provided with cutouts or recesses 43 to accommodate the brackets 42.

The back rest frame generally indicated at 46 is of a generally U-shaped configuration and is made of tubular aluminum stock and comprises a pair of spaced sides 48 connected by a top cross-member 50. The lower ends of the sides 48 of the back rest frame are pivotally secured by suitable pivot pins 52 to the upper ends of the U-shaped brackets 42.

The back rest generally indicated at 54 is likewise formed and integrally molded of a plastic material, similar to that of the seat, and comprises a wall surface 56 which has a border 58 extending along the bottom, opposite sides and top. The wall surface 56 of the back may be molded to form a distinctive ornamental configuration and should be of a configuration so that it may be molded in a die. A fragmentary portion of same is shown in FIG. 1. The border along the sides and top continues outwardly to form an arcuate shaped continuous flange 60 extending along the sides and the top and said flange 60 is identical to the shape and configuration of the flange 34 on the seat 32 and, hence, will not be redescribed. It is best shown in FIG. 6. The bottom border 58 of the back rest is provided with a rearwardly extending lip 62.

The back rest 54 is applied to the back frame 46 by positioning the lower end of the back rest adjacent the top of the back rest frame and sliding the back rest downwardly until the flange 60 along the upper edge of the back rest engages the top portion 50 of the back rest frame. In this position the back rest is supported by the back rest frame since the outer edge of the continuous flange 60 extends around a portion of the tubular back rest frame to prevent the back rest from slipping off of said back rest frame. It is additionally anchored to the back rest frame 46 at the pivot points of the arm rest, to be described.

An arm rest generally designated by the numeral 64, provided with downwardly spaced flanges 66, is secured on each side and said arm rest is pivotally secured to the front legs 12 as at 68 and is pivotally secured to the upper end of the rear legs as at 70 and is also pivotally secured as at 72 to the sides of the back rest frame. As best seen in FIG. 8, the flanges 66 of the arm rest receive a pivot pin which extends through alined openings in the front and rear legs The rear of the arm rest 64 has a pivot pin passing through the flange 66 and through an opening in the flange 60 of the back rest 54, as well as aligned openings in the sides 48 of the back rest frame.

When the back rest 54 is applied to the back rest frame 46, the back rest will assume a small curvature, particularly at the lower end of the back rest, as best shown in FIG. 1. This curvature conforms generally to the lower portion of the back of a person seated in the chair.

The chair is shown in FIG. 1 in its set-up position, however, it may be collapsed in the conventional manner wherein the seat and back rest are positioned adjacent each other and the front legs are pivoted to a position adjacent the rear legs so that the chair may be carried and stored in a collapsed position.

The novel feature of this invention resides in the formation of the seat and back rest, each integrally molded of a plastic material and so shaped and constructed that they may be slipped on to the conventional seat frame and conventional back rest frame. By this construction the cost of producing such a chair is reduced considerably from similar chairs now on the market and, further, the chairs are given a distinctive design which adds to their ornamentation and saleability.

What is claimed is:

1. A collapsible chair comprising a seat frame of tubular stock having a pair of sides and a front all integrally formed, a back frame of tubular stock having a pair of spaced sides and a top all integrally formed, front and rear legs for supporting said seat and connected for pivotal movement for collapsing or setting up said chair, a seat integrally formed of plastic material and having downwardly and inwardly extending curved side flanges integrally formed with said seat, said seat mounted on said seat frame and adapted to engage the sides of the seat frame by positioning the rear of the seat adjacent the front of the seat frame and sliding the seat rearwardly with respect to the seat frame and the sides of the frame, said seat flanges being of arcuate shape with the free edge of the flanges extending slightly inwardly of the longitudinal axis of the tubular sides of the seat frame so that the seat cannot be lifted from the seat frame, said arcuate-shaped flanges extending exteriorly around the outside surface of the sides of the seat frame with the opposite surface of the sides of the seat frame being free of the seat or the flanges thereof.

2. A chair as set forth in claim 1 in which the front of the seat has a downwardly and inwardly curved front flange of a shape conforming to the seat side flanges, which front flange engages the front of the seat frame.

3. A chair as set forth in claim 2 in which the seat side flanges and front flange is continuous.

4. A chair as set forth in claim 1 in which a back rest is mounted on the back frame, said back rest integrally formed of plastic material and having rearwardly and inwardly extending side flanges integrally formed with said back rest, said back rest mounted on said back frame and adapted to engage the sides of the back rest by positioning the lower end of the back rest adjacent the top of the back frame and sliding the back rest downwardly with respect to the back frame and the sides of the frame, said back rest flanges being arcuate shape with the free edge of the flange extending slightly inwardly of the longitudinal axis of the tubular sides of the back frame so that the back rest can only be removed by sliding same upwardly of the back frame.

5. A chair as set forth in claim 4 in which the top of the back rest has a downwardly and inwardly curved flange of a shape conforming to the back rest side flanges, which top flange engages the top of the back frame.

6. A chair as set forth in claim 5 in which the back rest side flanges and top flange is continuous.

* * * * *